United States Patent
Tran

(10) Patent No.: US 6,367,006 B1
(45) Date of Patent: *Apr. 2, 2002

(54) PREDECODE BUFFER INCLUDING BUFFER POINTER INDICATING ANOTHER BUFFER FOR PREDECODING

(75) Inventor: Thang M. Tran, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/619,986

(22) Filed: Jul. 20, 2000

Related U.S. Application Data

(63) Continuation of application No. 08/929,413, filed on Sep. 15, 1997, now Pat. No. 6,122,729, which is a continuation-in-part of application No. 08/855,099, filed on May 13, 1997, now Pat. No. 5,845,101.

(51) Int. Cl.[7] .................................................. G06F 9/42
(52) U.S. Cl. ....................................................... 712/244
(58) Field of Search ................................. 712/214, 244; 710/260

(56) References Cited

U.S. PATENT DOCUMENTS

| | | | | |
|---|---|---|---|---|
| 4,044,338 A | | 8/1977 | Wolf ............................. 365/49 |
| 4,287,561 A | * | 9/1981 | Liptay ......................... 712/217 |
| 4,453,212 A | | 6/1984 | Gaither et al. ................... 711/2 |
| 4,714,994 A | | 12/1987 | Oklobdziji et al. ........... 712/207 |
| 4,734,852 A | | 3/1988 | Johnson et al. ................ 712/41 |
| 4,807,115 A | | 2/1989 | Torng .......................... 712/215 |
| 4,858,105 A | | 8/1989 | Kuriyama et al. ........... 712/235 |
| 4,928,223 A | | 5/1990 | Dao et al. ..................... 712/247 |
| 5,053,631 A | | 10/1991 | Perlman et al. .............. 708/508 |
| 5,058,048 A | | 10/1991 | Gupta et al. ................. 708/508 |
| 5,129,067 A | * | 7/1992 | Johnson ........................ 712/213 |
| 5,136,697 A | | 8/1992 | Johnson ........................ 712/239 |
| 5,148,537 A | | 9/1992 | Belsan ......................... 711/131 |
| 5,170,476 A | | 12/1992 | Laakso et al. ................ 711/140 |
| 5,179,680 A | | 1/1993 | Colwell et al. .............. 711/125 |
| 5,226,126 A | | 7/1993 | McFarland et al. .......... 712/218 |

(List continued on next page.)

FOREIGN PATENT DOCUMENTS

| | | |
|---|---|---|
| EP | 0259095 | 3/1988 |
| EP | 0381471 | 8/1990 |
| EP | 0459232 | 12/1991 |
| GB | 2263985 | 8/1993 |
| GB | 2263987 | 8/1993 |
| GB | 2281422 | 3/1995 |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

Primary Examiner—David Y. Eng
(74) Attorney, Agent, or Firm—Conley, Rose & Tayon, PC; Lawrence J. Merkel

(57) ABSTRACT

A prefetch/predecode unit includes one or more prefetch buffers which are configured to store prefetched sets of instruction bytes and corresponding predecode data. Additionally, each prefetch buffer is configured to store a predecode byte pointer. The predecode byte pointer indicates the byte within the corresponding prefetched set of instruction bytes at which predecoding is to be initiated. Predecoding may be resumed within a given prefetch buffer if predecoding thereof is interrupted to predecode a different set of instruction bytes (e.g. a set of instruction bytes fetched from the instruction cache).

17 Claims, 6 Drawing Sheets

U.S. PATENT DOCUMENTS

| | | | |
|---|---|---|---|
| 5,226,130 A | 7/1993 | Favor et al. | 712/238 |
| 5,301,295 A | 4/1994 | Leary et al. | 711/125 |
| 5,301,338 A | 4/1994 | Yamamura et al. | 712/1 |
| 5,448,705 A | 9/1995 | Nguyen et al. | 712/244 |
| 5,450,561 A | 9/1995 | Ryan | 711/3 |
| 5,454,093 A | 9/1995 | Abdulhafiz et al. | 711/133 |
| 5,465,344 A | 11/1995 | Hirai et al. | 711/131 |
| 5,473,764 A | 12/1995 | Chi | 712/207 |
| 5,511,178 A | 4/1996 | Takeda et al. | 711/125 |
| 5,619,663 A | 4/1997 | Shalom et al. | 712/207 |
| 5,623,615 A | 4/1997 | Salem et al. | 712/238 |
| 5,651,125 A | 7/1997 | Witt et al. | 712/218 |
| 5,680,564 A | 10/1997 | Divivier et al. | 712/205 |
| 5,689,672 A | 11/1997 | Witt et al. | 712/213 |
| 5,692,168 A | 11/1997 | McMahan | 712/237 |
| 5,715,440 A | 2/1998 | Ohmura et al. | 712/233 |
| 5,734,881 A | 3/1998 | White et al. | 712/238 |
| 5,819,056 A * | 10/1998 | Favor | 712/204 |
| 5,845,101 A * | 12/1998 | Johnson et al. | 712/207 |
| 5,852,727 A | 12/1998 | Narayan et al. | 712/215 |
| 5,859,991 A * | 1/1999 | Narayan | 712/204 |
| 5,872,943 A * | 2/1999 | Pickett et al. | 712/204 |
| 5,983,321 A | 11/1999 | Tran et al. | 711/125 |

* cited by examiner

PREDECODE BUFFER INCLUDING BUFFER POINTER INDICATING ANOTHER BUFFER FOR PREDECODING

This application is a continuation of U.S. patent application Ser. No. 08/929,413, filed Sep. 15, 1997 now U.S. Pat. No. 6,122,729, which is a continuation-in-part of U.S. patent application Ser. No. 08/855,099, filed May 13, 1997, now U.S. Pat. No. 5,845,101.

BACKGROUND OF THE INVENTION

1. Field of the Invention

This invention is related to the field of microprocessors and, more particularly, to prefetching and predecoding of instruction bytes within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

In order to facilitate the location and dispatch of multiple instructions concurrently, many superscalar microprocessors employ predecoding. Predecoding refers to analyzing instruction bytes as they are fetched from main memory and stored into the instruction cache. The predecode data generated as a result of the predecoding is stored in the instruction cache as well. When the instruction bytes are fetched for dispatch into the instruction processing pipeline of the microprocessor, the corresponding predecode data is used by the instruction dispatch mechanism to identify the instructions and to aid in the routing of the instructions to particular functional units.

Generally speaking, predecode data comprises one or more bits of information generated by decoding the corresponding instruction bytes prior to storing the bytes into an instruction cache of a microprocessor. The predecode data varies depending upon many factors including: the nature of the instruction set defined by the microprocessor architecture employed by the microprocessor, the hardware execution units included in the microprocessor, etc. As a general rule, predecode data is generated to allow quick determination of a relevant characteristic of the instruction bytes being fetched where determining that characteristic from examining the bytes themselves may require a substantially longer period of time. The amount of time required to determine the characteristic may be so long that a certain clock cycle time or frequency for the microprocessor may be unachievable without adding pipeline stages to the instruction processing pipeline of the microprocessor.

For example, a microprocessor outfitted with various execution units which execute different subsets of the instruction set may need to quickly determine which subset a particular instruction belongs to in order to route the instruction to an appropriate execution unit. The predecode data for such an example may include an indication of the subset including the instruction, allowing the instruction dispatcher to identify an appropriate execution unit. In another example, a variable length instruction set (in which different instructions and/or different operand options for the same instruction occupy different numbers of bytes) may be employed by the microprocessor. The x86 instruction set is an exemplary variable length instruction set in which instructions may be between 1 and 15 bytes. In such a microprocessor, it is difficult to concurrently locate multiple instructions since the length of each instruction varies and is not determined until the instruction is at least partially decoded. Predecode data in this case may include indications of instruction boundaries (e.g. a byte at which an instruction begins or ends), such that a set of bytes forming an instruction may be quickly located and routed to an execution unit.

Unfortunately, for many of the same reasons that make predecoding desirable, the process of performing predecoding may be quite slow. During the predecoding, events may occur which cause the predecoding to be abandoned. For example, a branch misprediction may occur causing instruction fetch to begin at a new address. If predecoding of the instructions at the new address is required, the predecoder may abandon predecoding of the instructions. Alternatively, a branch instruction may be detected within the instructions being predecoded. If the branch prediction mechanism employed by the microprocessor predicts the branch taken, then the predecoder may predecode instructions at the predicted target address of the branch instruction instead of completing predecode of the current instruction cache line. In such a case, the incomplete set of predecode data may be stored into the instruction cache. If the instruction bytes which were not predecoded are later fetched, then the predecoder must predecode the instructions at that time. In many cases, the instructions subsequent to the predicted branch instruction will be executed. For example, if the predicted branch instruction is a subroutine call instruction, then the subsequent instructions will generally be executed upon return from the subroutine.

In either of the examples of predecode interruption given above, as well as others, predecode occurs at a later time when the instructions are needed in the instruction processing pipeline. Performance of the microprocessor may suffer as the instruction processing pipeline awaits the results of the predecoding. Furthermore, the time elapsing for fetching the bytes from external memory is quite large in many cases. Performance of the microprocessor may suffer as the instruction processing pipeline endures these delays as well.

SUMMARY OF THE INVENTION

The problems outlined above are in large part solved by a prefetch/predecode unit in accordance with the present invention. The prefetch/predecode unit includes one or more prefetch buffers which are configured to store prefetched sets of instruction bytes and corresponding predecode data. Additionally, each prefetch buffer is configured to store a predecode byte pointer. The predecode byte pointer indicates the byte within the corresponding prefetched set of instruction bytes at which predecoding is to be initiated. Advantageously, predecoding may be resumed within a given prefetch buffer if predecoding thereof is interrupted to predecode a different set of instruction bytes (e.g. a set of instruction bytes fetched from the instruction cache). Predecoding of the sets of instruction bytes within the prefetch buffer may thereby be reinitiated at a time when the predecoder would otherwise be idle. Performance of the microprocessor may be increased by the generation of additional predecode data. Should the instructions corresponding to the additional predecode data be fetched at a later time, the predecode data is available for execution.

Broadly speaking, the present invention contemplates a prefetch/predecode unit comprising a prefetch buffer and a control unit. The prefetch buffer is configured to store a first plurality of instruction bytes and corresponding predecode data. Furthermore, the prefetch buffer is configured to store a pointer indicating at which one of the first plurality of instruction bytes predecoding is to be initiated. Coupled to the prefetch buffer, the control unit is configured to predecode the first plurality of instruction bytes to generate the corresponding predecode data. Additionally, the control unit is configured to initiate predecoding at the one of the first plurality of instruction bytes indicated by the pointer.

The present invention further contemplates a microprocessor comprising an instruction cache and a prefetch/predecode unit. The instruction cache is configured to store a plurality of cache lines of instruction bytes and a corresponding plurality of predecode data. In addition, the instruction cache is configured to fetch one of the plurality of cache lines of instruction bytes and one of the corresponding plurality of predecode data in response to a fetch address. Still further, the instruction cache is configured to scan the one of the corresponding plurality of predecode data to determine if instructions being fetched are identified therein and to generate a predecode request if instructions being fetched are not identified therein. Coupled to the instruction cache, the prefetch/predecode unit is configured to store a prefetched cache line of instruction bytes. The prefetch/predecode unit is configured to predecode instructions within the prefetched cache line of instruction bytes. In addition, the prefetch/predecode unit is configured to interrupt predecoding of instructions within the prefetched cache line of instruction bytes upon receiving the predecode request.

Moreover, the present invention contemplates a method for predecoding a prefetched cache line. Predecode of the prefetched cache line is initiated. The predecoding of the prefetched cache line is interrupted to predecode a cache line stored in the instruction cache. Predecoding of the prefetched cache line is resumed upon completing the predecode of the cache line from the instruction cache.

BRIEF DESCRIPTION OF THE DRAWINGS

Other objects and advantages of the invention will become apparent upon reading the following detailed description and upon reference to the accompanying drawings in which.

Figure 1:
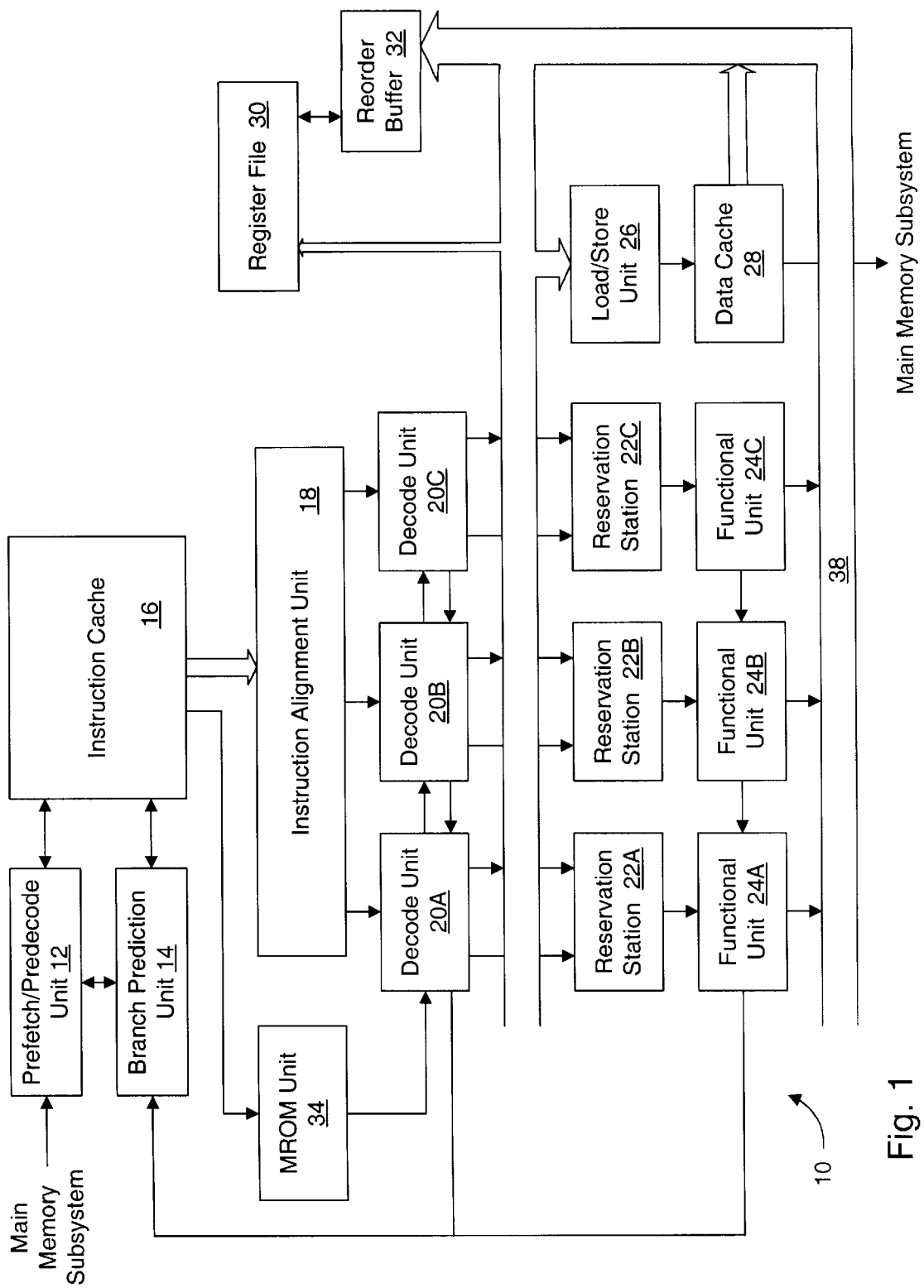
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, prefetch/predecode unit 12 includes one or more prefetch buffers for storing prefetched instruction bytes and corresponding predecode information. In addition, each prefetch buffer stores a pointer indicating a byte within the prefetched instruction bytes at which predecoding is to be initiated. Advantageously, predecoding of the prefetched instruction bytes may be resumed after interruption of the predecoding. Additional predecode data corresponding to the prefetched instruction bytes may be generated even though predecoding of the prefetched instruction bytes may have been interrupted. If the additional predecode data is used by microprocessor 10 at a later time, performance of the microprocessor may be increased.

Predecoding of the prefetched instruction bytes can be interrupted by a predecode request from instruction cache 16. Instruction cache 16 generates a predecode request if invalid predecode data is detected for instruction bytes being fetched therefrom. In addition, predecoding of prefetched instruction bytes in one prefetch buffer may be interrupted by a hit by a fetch address in another prefetch buffer. Predecoding of the prefetched instruction bytes within the other prefetch buffer is then performed to provide predecode data for the instructions being fetched. While predecoding of a set of instruction bytes within a prefetch buffer may result in a predicted branch, predecoding within that prefetch buffer may continue until predecoding of instructions at the branch target is needed or until predecoding of the set of instruction bytes is complete.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte cache lines (a byte comprises 8 binary bits). As used herein, the term "cache line" refers to the smallest unit of memory manipulated by a cache. The bytes within the cache line are allocated space and deallocated space within the cache as a unit. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. In one embodiment, as prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode unit 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode unit 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode unit 20 as the byte associated with the first clear functional bit in the instruction. For example, a fast path instruction including two prefix bytes, a Mod R/M byte, and an immediate byte would have start, end, and functional bits as follows:

| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode unit 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction.

When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode unit 20 are configured to decode instructions received from instruction alignment unit 18. Register operand information is detected and routed to register file 30 and reorder buffer 32. Additionally, if the instructions require one or more memory operations to be performed, decode unit 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode unit 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode unit 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
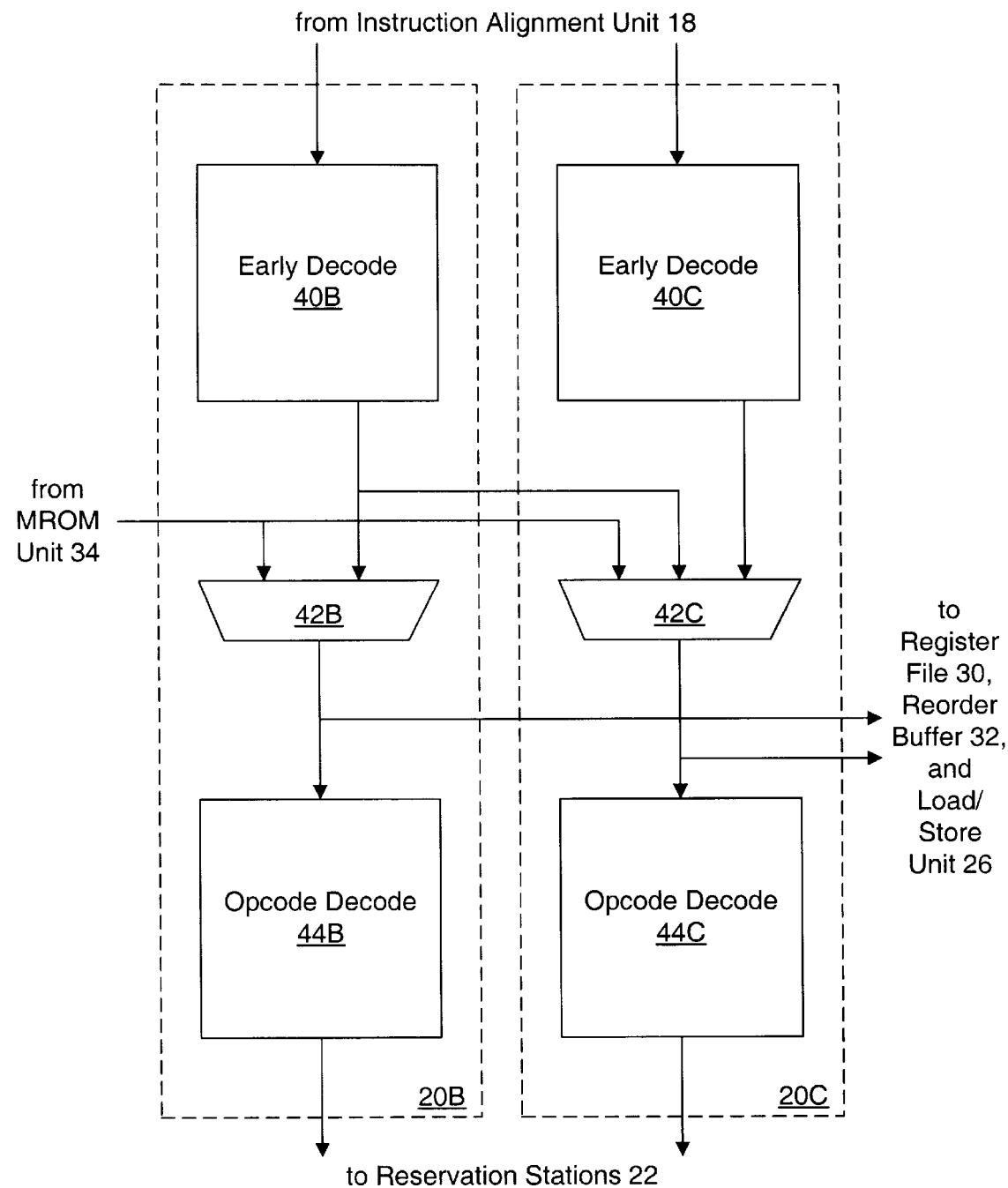
FIG. 2 is a block diagram of one embodiment of a pair of decode units within the microprocessor shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
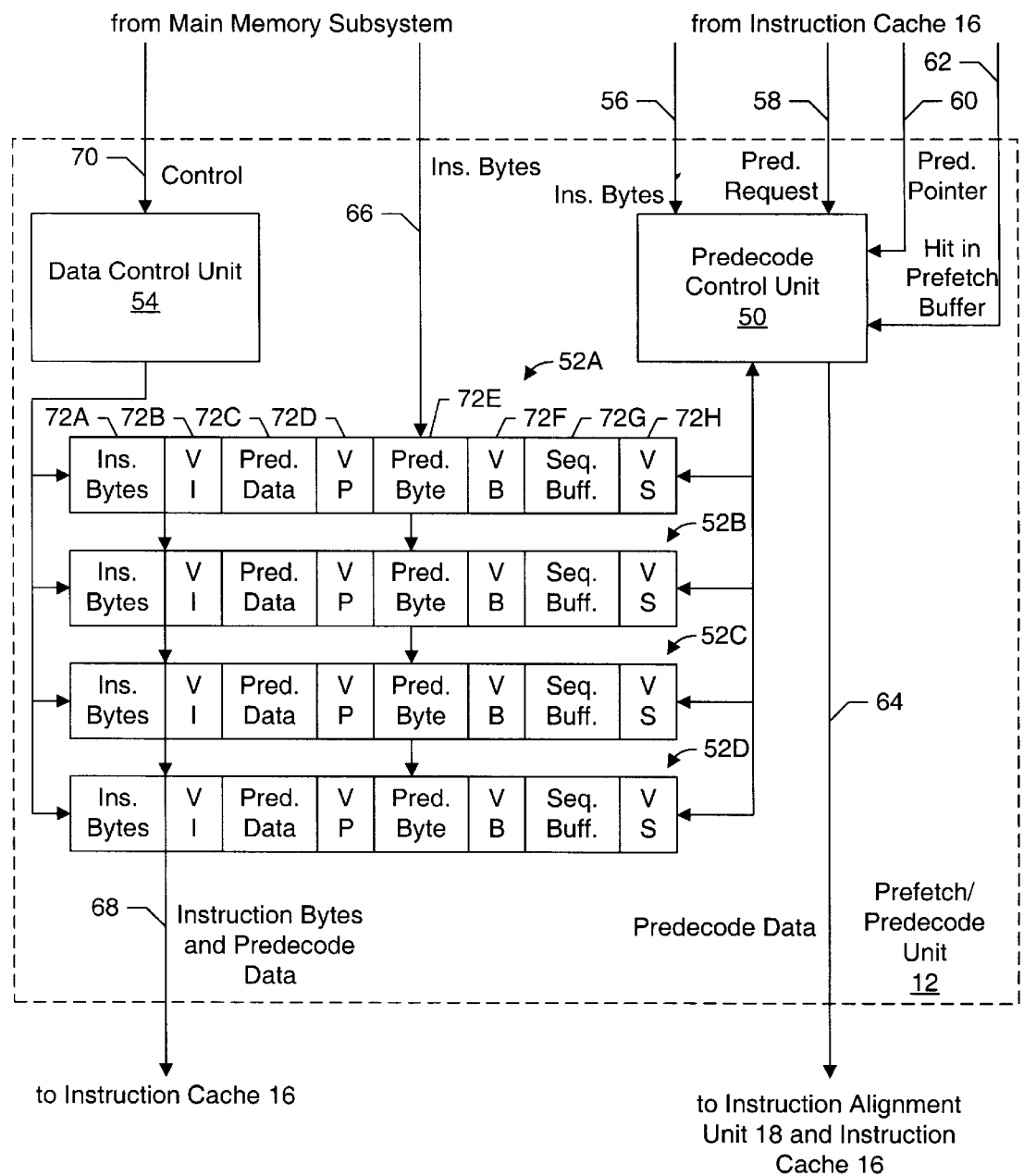
FIG. 3 is a block diagram of one embodiment of a prefetch/predecode unit shown in FIG. 1.

Turning now to FIG. 3, a block diagram of one embodiment of prefetch/predecode unit 12 is shown. As shown in FIG. 3, prefetch/predecode unit 12 includes one embodiment of a predecode control unit 50, one embodiment of a plurality of prefetch buffers 52A–52D, and one embodiment of a data control unit 54. Predecode control unit 50 is coupled to prefetch buffers 52A–52D and a predecode data bus 64 which is coupled to instruction alignment unit 18 and instruction cache 16. Additionally, predecode control unit 50 is coupled to an instruction bytes bus 56, a predecode request line 58, a predecode pointer bus 60, and a hit in prefetch buffer bus 62. Each of buses 56–62 are further coupled to instruction cache 16. Each of prefetch buffers 52A–52D is coupled to an instruction bytes bus 66 from the main memory subsystem, as well as to an instruction bytes and predecode data bus 68 which is also coupled to instruction cache 16. Data control unit 54 is coupled to each of prefetch buffers 52A–52D, and to a control bus 70 from the main memory subsystem.

Generally, instruction bytes fetched from the main memory subsystem are stored into prefetch buffers 52A–52D for subsequent storage into instruction cache 16. The main memory subsystem provides the fetched instruction bytes upon an instruction bytes bus 66 and indicates, on control bus 70, which prefetch buffer 52A–52D is to store the provided bytes. The total number of instruction bytes stored in a prefetch buffer 52A–52D may be provided via multiple transfers upon instruction bytes bus 66, in which case the portion of the instruction bytes being provided during a given transfer is also indicated upon control bus 70. Data control unit 54 receives control signals from the main memory subsystem upon control bus 70 and directs storage of the instruction bytes into the indicated prefetch buffer. The main memory subsystem selects a prefetch buffer 52A–52D for storing the instruction bytes when a main memory fetch request is received from instruction cache 16 (e.g. due to a cache miss or a prefetch request). The main memory subsystem indicates a selected prefetch buffer 52A–52D via control bus 70. In response to a prefetch buffer 52A–52D being selected, data control unit 54 sets each of the validity indications (described below) within the selected prefetch buffer 52A–52D to indicate invalidity.

Prefetch buffers 52A–52D provide storage for prefetched sets of instruction bytes prior to storage of the prefetched sets of instruction bytes in instruction cache 16. An instruction bytes field 72A within each prefetch buffer 52A–52D stores a set of instruction bytes. For clarity in the drawing, only fields within prefetch buffer 52A will be assigned reference numerals. However, each prefetch buffer is shown in FIG. 3 as having the same set of fields. According to one embodiment, each prefetch buffer 52A–52D is configured to store a cache line of instruction bytes. However, other embodiments may be configured to store a portion of a cache line. For example, if instruction cache 16 employs sectoring in which a sector of the cache line may be valid while another sector is invalid, prefetch buffers 52A–52D may store a sector. The remainder of this disclosure may refer to cache lines of instruction bytes being stored in each of prefetch buffers 52A–52D, but it is understood that other sized portions of instruction bytes may be stored.

A valid instruction indication field 72B stores a validity indication indicating whether or not instruction bytes field 72A is storing a set of instruction bytes. In one embodiment, the validity indication is a bit indicative, when set, that a set of instruction bytes are stored in the prefetch buffer and indicative, when clear, that a set of instruction bytes are not stored in the prefetch buffer. Other validity indications described below may similarly comprise a bit indicative, when set, of validity and indicative, when clear, of invalidity. On the other hand, the validity indication in valid instruction indication field 72B may comprise a multiple bit value indicating which portions of instruction bytes field 72A are valid, in the case that the set of instruction bytes stores in instruction bytes field 72A is provided via multiple transfers upon instruction bytes bus 66. Data control unit 54 manages the state of instruction indication field 72B in response to instruction bytes received from the main memory subsystem and in response to selection of a prefetch buffer 52A–52D to store a cache line being fetched.

Predecode control unit 50 is configured to predecode instruction bytes. The instruction bytes being predecoded may be provided by instruction cache 16 or may be read from a prefetch buffer 52A–52D. In one embodiment, predecode control unit 50 is configured to determine the length of each instruction within the instruction bytes, and form predecode data according to the length determination (e.g. start and end bits). Furthermore, predecode control unit 50 may be configured to generate additional predecode data (e.g. functional bits). In one embodiment, predecode control unit 50 is configured to predecode one instruction at a time. During a first clock cycle, the first several bytes of the instruction are selected from the instruction bytes being predecoded. During a second clock cycle, the bytes are decoded to determine if the opcode byte and addressing mode bytes (from which the length of the instruction can be determined) are within the selected bytes and to determine the instruction boundaries therefrom. If only prefix bytes are included in the selected bytes, additional clock cycles are used to select subsequent bytes in order to locate the opcode and addressing mode bytes. Predecode data is formed for the instruction during a third clock cycle. The end of the instruction is determined, and is used to select the first several bytes of the subsequent instruction from the instruction bytes being predecoded. In one embodiment, four bytes are selected and examined in parallel by predecode control unit 50.

Instruction cache 16 is configured to scan the predecode data fetched therefrom (corresponding to instruction bytes being concurrently fetched therefrom) to determine if the predecode data is valid. Predecode data may be invalid if the cache line was stored into instruction cache 16 prior to the completion of predecoding. Alternatively, predecode data may be invalid if the particular byte identified by the least significant bits of the fetch address to instruction cache 16 is not indicated as the start byte of the instruction. Still further, predecode data may be invalid if a pair of start bytes are indicated without an intervening end byte or an end byte is encountered and the succeeding byte within the cache line is not indicated to be a start byte. Instruction cache 16, upon determining that predecode data corresponding to instruction bytes being fetched is invalid, provides a predecode request to prefetch/predecode control unit 12. Instruction cache 16 provides the set of fetched instruction bytes upon instruction bytes bus 56, and asserts a predecode request signal upon predecode request line 58. Additionally, a pointer to the byte within the set of fetched instruction bytes at which predecoding is to be initiated is indicated on a predecode pointer bus 60. The pointer may be the least significant bits of the fetch address, if all of the predecode data corresponding to the bytes being fetched is invalid, or may point to a byte subsequent to the byte indicated by the fetch address, if a portion of the predecode data is valid.

In response to instruction cache 16 requesting predecode, predecode control unit 50 interrupts any predecoding which may be in progress for a prefetch buffer 52A–52D and predecodes the instruction bytes provided from instruction cache 16. As predecode data for these instruction bytes is generated, predecode control unit 50 conveys the predecode data to instruction alignment unit 18 (for use in selecting instructions from the instruction bytes being fetched for dispatch to a decode unit 20) and to instruction cache 16 (for storage with the cache line from which the instruction bytes were fetched) upon predecode data bus 64. In order to dispatch instructions in rapid fashion, predecode unit 50 provides the predecode data for each instruction, as it is generated, to instruction alignment unit 18. On the other hand, the predecode data may be provided in a single transfer to instruction cache 16 for updating the cache line, in order to minimize the number of updates generated to instruction cache 16. Alternatively, a cache holding register may be used within instruction cache 16 to assemble the updated predecode data. Predecode data bus 64 may include sufficient signals to transfer a cache line worth or predecode data in parallel, since instructions may begin and end at arbitrary points within the cache line.

A fetch address being presented to instruction cache 16 may hit in a prefetch buffer 52A–52D instead of instruction cache 16. This situation is signaled to predecode control unit 50 via hit in prefetch buffer bus 62. Additionally, the prefetch buffer which is hit by the fetch address (i.e. which is storing the instruction bytes to be fetched) is indicated upon hit in prefetch buffer bus 62. Still further, the least significant bits of the fetch address (identifying the initial byte being fetched within the cache line) is conveyed upon predecode pointer bus 60.

In response to a fetch hitting in the prefetch buffer, predecode control unit 50 interrupts any predecoding it may be performing in a different prefetch buffer and reads instruction bytes from the indicated prefetch buffer 52A–52D. In addition, predecode control unit 50 reads the predecode byte pointer stored in the indicated prefetch buffer. If the predecode byte pointer indicates a byte subsequent to the byte indicated by the predecode pointer upon predecode pointer bus 58, predecode control unit 50 conveys the predecode data from the indicated prefetch buffer 52A–52D to instruction alignment unit 18 and instruction cache 16, and predecode is initiated at the byte indicated by the predecode byte pointer. On the other hand, if the predecode byte pointer indicates a byte prior to the byte indicated by the predecode pointer, then predecoding is initiated at the predecode pointer provided upon predecode pointer bus 58. As with the predecoding of instruction bytes from instruction cache 16, predecode data generated by predecode control unit 50 is conveyed to instruction alignment unit 18 and instruction cache 16 upon predecode data bus 64 as the predecode data is generated.

If predecode control unit 50 is predecoding instructions within a particular prefetch buffer 52A–52D, predecode control unit 50 stores the generated predecode data into the predecode data field 72C of the particular prefetch buffer 52A–52D. In addition, a pointer indicating the first byte of the subsequent instruction is stored into predecode byte pointer field 72E and the corresponding validity indication in predecode pointer valid field 72F is set to the valid state. In this manner, if predecoding is interrupted, the previously generated predecode data is stored in the prefetch buffer as well as an indication of the byte at which predecoding should be resumed. If predecoding of the cache line stored in the particular prefetch buffer 52A–52D is complete, predecode control unit 50 sets the validity indication within valid predecode indication field 72D to the valid state. Additionally, a different prefetch buffer 52A–52D is selected for predecoding. In this manner, predecode control unit 50 is continuously predecoding until each of the prefetch buffers 52A–52D store complete predecode data and no predecode request is received from instruction cache 16.

It is noted that, if predecode control unit 50 detects a predicted taken branch within the instruction bytes being predecoded and the instruction bytes are currently being fetched (i.e. a predecode request from instruction cache 16, a hit in prefetch buffer request, or a prefetch buffer which is the result of a cache miss currently being processed by instruction cache 16), predecode control unit 50 informs branch prediction unit 14 and instruction cache 16. Instruction fetching then continues at the predicted target of the fetch address. If the instruction bytes being predecoded at the time the branch instruction is detected were provided by instruction cache 16, predecode control unit 50 ceases predecoding of those instruction bytes and selects a prefetch buffer for predecoding. On the other hand, if the instruction bytes being predecoded are stored in one of prefetch buffers 52A–52D, predecode control unit 50 continues predecoding the instruction bytes.

Prefetch buffers 52A–52D store predecode data in a predecode data field 72C. In one embodiment, the predecode data comprises the start, end, and functional bits described above for each byte within the cache line. Other embodiments may employ different sets of predecode data on a byte basis or an instruction basis, for example. Furthermore, prefetch buffers 52A–52D may store branch prediction information as well in one embodiment.

The predecode byte pointer stored in predecode byte pointer field 72E locates the byte within the cache line stored in the prefetch buffer at which predecoding is to be initiated. If predecode control unit 50 is able to return to a particular prefetch buffer 52A–52D to resume predecoding, the byte at which predecoding is to be resumed is indicated by the predecode byte pointer. It is noted that, in one embodiment, predecode control unit 50 is configured to generate predecode data for a full instruction at a time. In such an embodiment, the predecode byte pointer within predecode byte pointer field 72E represents the start byte of a subsequent instruction (e.g. an instruction boundary). A predecode pointer validity field 72F stores a validity indication indicating whether or note the predecode byte pointer is valid. If the predecode byte pointer is invalid, predecoding begins at an initial byte within the cache line (i.e. the byte which is prior to the other bytes within the cache line). As used herein, a first instruction byte is "prior" to a second instruction byte in the cache line if the first instruction byte would be accessed before the second instruction byte if instruction fetching were to proceed, byte by byte, through the cache line. A first instruction byte is "subsequent" to a second instruction byte within the cache line if the first instruction byte would be accessed after the second instruction byte if instruction fetching were to proceed, byte by byte, through the cache line. In other words, the prior instruction byte is stored at a numerically smaller address than the subsequent instruction byte.

In one embodiment, prefetch/predecode unit 12 is configured to prefetch cache lines of instruction bytes from the main memory subsystem. When a cache miss in instruction cache 16 is detected, the missing cache line is fetched from the main memory subsystem. In addition, the cache line sequential to the missing cache line is fetched. A second cache line is sequential to a first cache line if execution of instructions within the second cache line succeeds execution of instructions within the first cache line in the absence of branch instructions or interrupts. In other words, the initial byte of the second cache line is consecutive to and subsequent to the final byte of the first cache line.

If the sequential cache line to a cache line within prefetch buffers 52A–52D is also fetched, the prefetch buffer storing the sequential cache line is indicated in the particular prefetch buffer storing the cache line to which the sequential cache line is sequential. The indication of the sequential cache line is a sequential buffer pointer in a sequential buffer pointer field 72G. A validity indication for the sequential buffer pointer is stored in sequential buffer validity field 72H. The sequential buffer indication is provided by the main memory subsystem upon control bus 70.

Instruction bytes and the corresponding predecode data are transferred to instruction cache 16 upon instruction bytes and predecode data bus 68. The information may be transferred from a particular prefetch buffer 52A–52D if a hit in the prefetch buffer is detected. Additionally, the information may be transferred during clock cycles in which cache misses have been detected and are being fetched from the main memory subsystem, or during clock cycles in which a mispredicted branch has been detected (while the correct target address of the branch instruction is translated). During these clock cycles, instruction cache 16 is idle and may receive the data. The main memory subsystem maintains address information for the cache lines stored in prefetch buffers 52A–52D, and indicates which prefetch buffer 52A–52D is to transmit information to instruction cache 16 via control bus 70. Alternatively, the address information may be maintained by instruction cache 16 and instruction cache 16 may indicate which prefetch buffer is to transmit information.

Figure 4:
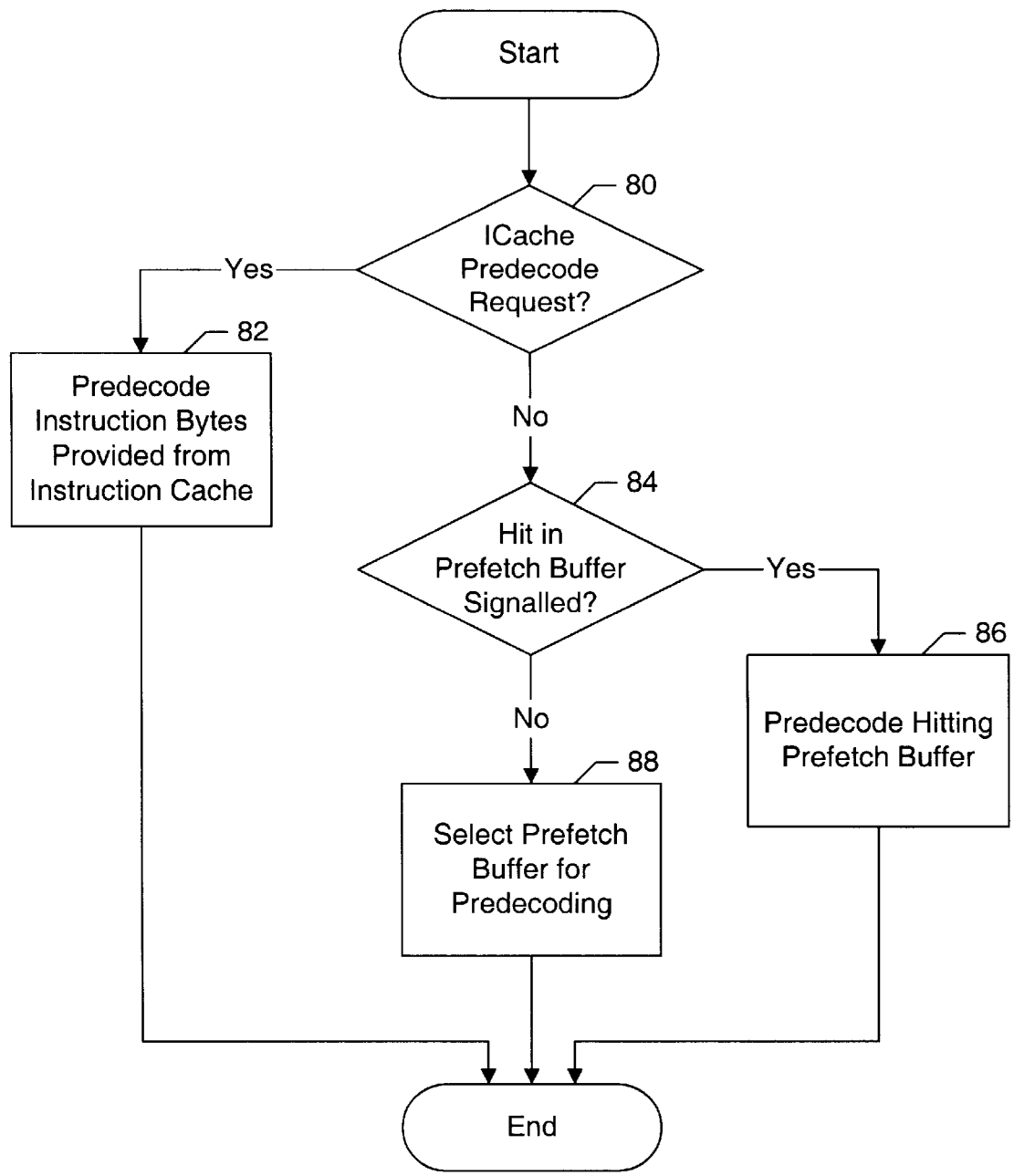
FIG. 4 is a flowchart illustrating selection of a plurality of instruction bytes for predecoding according to one embodiment of the prefetch/predecode unit shown in FIG. 3.

Turning now to FIG. 4, a flowchart illustrating selection of instruction bytes to predecode according to one embodiment of predecode control unit 50 is shown. The flowchart shown in FIG. 4 is evaluated each time predecode control unit 50 completes predecoding of a cache line or a set of instruction bytes provided by instruction cache 16. Additionally, the flowchart is evaluated upon interrupting predecode due to a predecode request signal or a hit in prefetch buffer signal. Predecode control unit 50 determines if instruction cache 16 is asserting a predecode request (decision block 80).

Predecode requests from instruction cache 16 are considered high priority because the instructions to be predecoded are currently being fetched for execution within the core of microprocessor 10. Since instruction alignment unit 18 uses the predecode data to locate and route instructions, the predecode data for the fetched instructions is generated. If instruction cache 16 is requesting predecode, then the instruction bytes provided by instruction cache 16 are predecoded (step 82).

Alternatively, if instruction cache 16 is not requesting predecode, predecode control unit 50 determines if a hit in the prefetch buffers is being signalled (decision block 84). If a hit in the prefetch buffer is being signalled, predecode control unit 50 selects the instruction bytes from the particular prefetch buffer hit by the fetch request and predecodes those instruction bytes (step 86). As mentioned above, the byte at which predecoding is initiated may be the byte indicated by the fetch address or a subsequent byte, depending upon whether or not predecode control unit 50 has already predecoded additional instructions within the hit line.

If a hit in the prefetch buffer is not being signalled, predecode control unit 50 selects one of the prefetch buffers for predecoding (step 88). One method for selecting one of the prefetch buffers is described in more detail below. However, any method for selecting one of the prefetch buffers for predecoding may be used. It is noted that, while the steps shown in FIG. 4 are shown serially for ease of illustration, the steps may be performed in any suitable order and may be performed in parallel by combinatorial logic.

Figure 5:
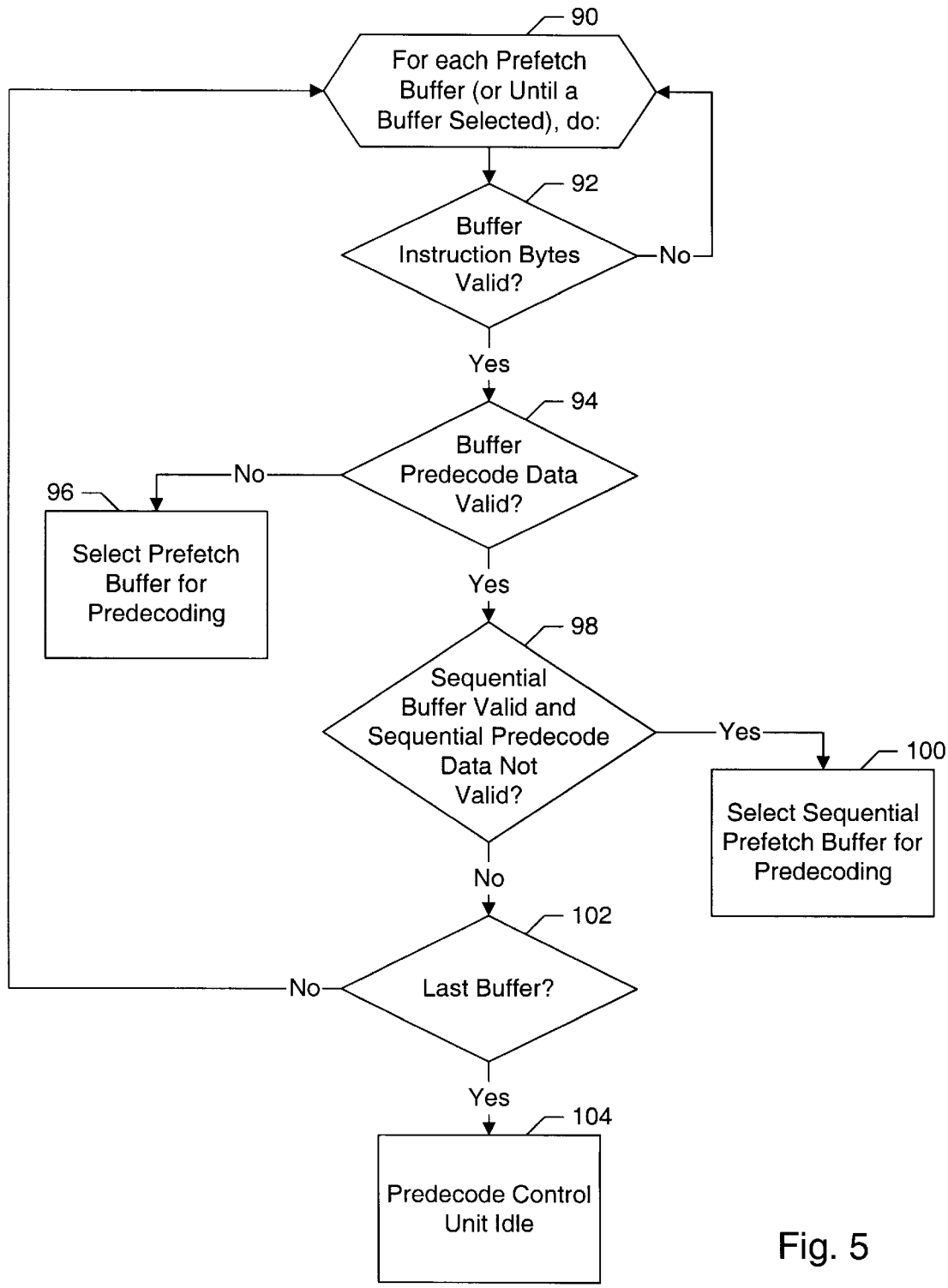
FIG. 5 is a flowchart illustrating selection of one of a plurality of prefetch buffers for predecoding according to one embodiment of the prefetch/predecode unit shown in FIG. 3.

Turning next to FIG. 5, a flowchart is shown illustrating a method for selecting one of prefetch buffers 52A–52D for predecoding. One embodiment of predecode control unit 50 may employ the method illustrated in FIG. 5. It is noted that, while the steps shown in FIG. 5 are shown serially and in a loop performed for each prefetch buffer for ease of illustration, the steps may be performed in any suitable order and may be performed in parallel by combinatorial logic.

As illustrated by preparation step 90, predecode control unit 50 performs the steps illustrated in the flow chart for each prefetch buffer 52A–52D. A prefetch buffer being analyzed during a particular iteration of the loop illustrated in FIG. 5 is referred to below as the "current prefetch buffer". Prefetch buffer 52A, if selectable given the steps performed in the flowchart, is given highest priority for selection if more than one prefetch buffer 52A–52D is selectable. Prefetch buffer 52B is given second highest priority; prefetch buffer 52C is given third highest priority; and prefetch buffer 52D is given fourth highest priority. Other embodiments may employ a different priority scheme.

Predecode control unit 50 determines if the instruction bytes within the prefetch buffer are valid by examining the valid instruction indication stored in the prefetch buffer 52A–52D (decision block 92). If the instruction bytes are not valid, then the next prefetch buffer 52A–52D is analyzed. If the instruction bytes are valid, then predecode control unit 50 continues analyzing the current prefetch buffer 52A–52D.

Predecode control unit 50 determines if the current prefetch buffer 52A–52D already contains valid predecode data (decision block 94). As mentioned above, a valid predecode indication is stored in each prefetch buffer 52A–52D. The valid predecode indication indicates whether or not the predecode data is valid (i.e. predecoding is complete). If the predecode data is not valid, then the prefetch buffer is selected for predecoded (step 96).

If the predecode data in the current prefetch buffer is valid, predecode control unit 50 determines whether or not the sequential buffer indication is valid and whether or not the sequential buffer predecode data is valid (decision block 98). If the sequential buffer indication is valid and the sequential predecode data is not valid, then the sequential buffer is selected (i.e. the prefetch buffer indicated as storing the sequential cache line to the cache line in the current prefetch buffer is selected—step 100).

If the sequential buffer indication is not valid or the predecode data in the sequential buffer is valid, the next buffer 52A–52D is analyzed (decision block 102). If each prefetch buffer 52A–52D has been analyzed, predecode control unit 50 is idle (step 104).

Figure 6:
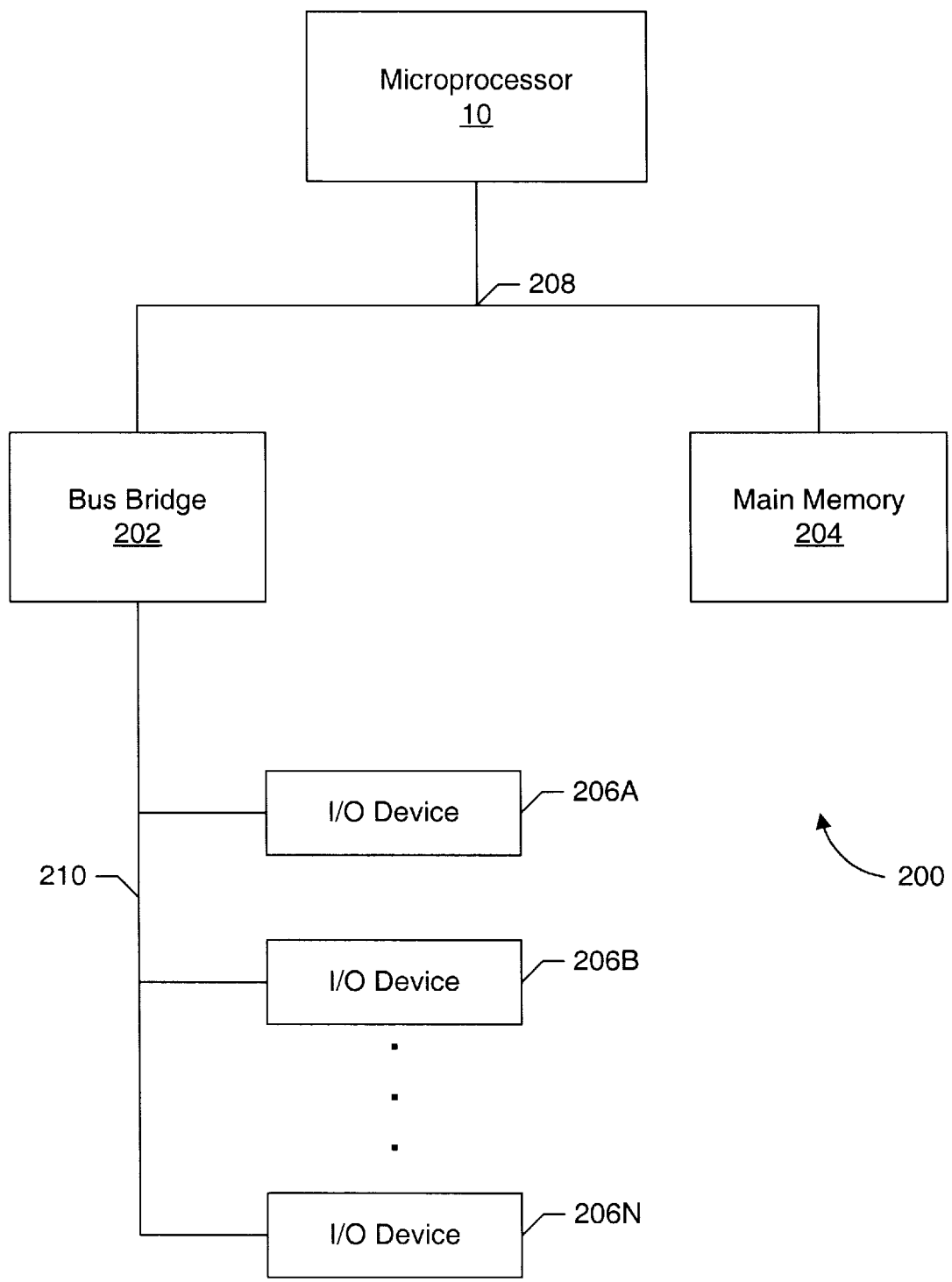
FIG. 6 is a block diagram of one embodiment of a computer system including the microprocessor shown in FIG. 1.

Turning now to FIG. 6, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 6 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |

TABLE 1-continued x86 Fast Path, Double Dispatch, and MROM Instructions

| X86 Instruction | Instruction Category |
|---|---|
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |

TABLE 1-continued x86 Fast Path, Double Dispatch, and MROM Instructions

| X86 Instruction | Instruction Category |
| --- | --- |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note:
Instructions including an SIB byte are also considered double dispatch instructions.

In accordance with the above disclosure, a microprocessor has been described which stores the position within each set of instruction bytes stored in a set of prefetch buffers at which predecoding of that set of instruction bytes was halted. Predecoding of the instruction bytes may thereby be reinitiated after predecoding is interrupted for a higher priority predecoding service. Advantageously, if the predecoder would otherwise be idle it may predecode instruction bytes stored in the prefetch buffers. Performance may be increased if the instructions stored in the prefetch buffers are later fetched by the microprocessor, in that predecoding is already complete.

Numerous variations and modifications will become apparent to those skilled in the art once the above disclosure is fully appreciated. It is intended that the following claims be interpreted to embrace all such variations and modifications.

What is claimed is:

1. A processor comprising:
    a plurality of prefetch buffers, each of said plurality of prefetch buffers configured to store a plurality of instruction bytes and a buffer pointer for indicating another one of said plurality of prefetch buffers; and
    a control unit coupled to said plurality of prefetch buffers, wherein said control unit is configured to predecode instruction bytes stored in said plurality of prefetch buffers, and wherein said control unit is configured to detect that predecode is complete for a first buffer of said plurality of prefetch buffers, and wherein said control unit is configured to select a second buffer of said plurality of prefetch buffers for predecoding to generate predecode data for storage in an instruction cache, the control unit selecting the second buffer responsive to said buffer pointer in said first buffer.

2. The processor as recited in claim 1 wherein said plurality of instruction bytes in said second buffer are sequential to said plurality of instruction bytes in said first buffer.

3. The processor as recited in claim 1 wherein each of said plurality of prefetch buffers is further configured to store a valid indication indicative of validity of said buffer pointer, and wherein said control unit is configured to select said second buffer further responsive to said valid indication in said first buffer.

4. The processor as recited in claim 1 wherein each of said plurality of prefetch buffers is further configured to store a valid indication and predecode data, wherein said valid indication is indicative of validity of said predecode data, and wherein said control unit is configured to detect that predecode is complete for said first buffer responsive to said valid indication in said first buffer.

5. The processor as recited in claim 4 wherein said control unit is configured to predecode instruction bytes in said second buffer further responsive to said valid indication in said second buffer indicating invalid.

6. The processor as recited in claim 1 wherein said control unit is configured to predecode said plurality of instruction bytes stored in said second buffer responsive to selecting said second buffer.

7. A method comprising:
    detecting that predecode of a first plurality of instruction bytes in a first prefetch buffer is complete;
    selecting a second prefetch buffer for predecoding of a second plurality of instruction bytes stored therein responsive to said detecting and further responsive to a buffer pointer in said first prefetch buffer indicating said second prefetch buffer;
    predecoding said second plurality of instruction bytes to generate predecode data; and
    storing said predecode data in an instruction cache.

8. The method as recited in claim 7 wherein said second plurality of instruction bytes is sequential to said first plurality of instruction bytes.

9. The method as recited in claim 7 wherein said first prefetch buffer is further configured to store a valid indication indicative of validity of said buffer pointer, wherein said selecting is further responsive to said valid indication.

10. The method as recited in claim 7 wherein said first prefetch buffer is further configured to store a valid indication indicative of validity of predecode data stored in said first prefetch buffer, wherein said detecting is responsive to said valid indication.

11. The method as recited in claim 10 wherein said second prefetch buffer is further configured to store said valid indication, the method further comprising predecoding the second plurality of instruction bytes responsive to said valid indication indicating invalid.

12. The method as recited in claim 7 further comprising predecoding said second plurality of instruction bytes responsive to said selecting.

13. A computer system comprising:
    a processor comprising:
        a plurality of prefetch buffers, each of said plurality of prefetch buffers configured to store a plurality of instruction bytes and a buffer pointer for indicating another one of said plurality of prefetch buffers; and
        a control unit coupled to said plurality of prefetch buffers, wherein said control unit is configured to predecode instruction bytes stored in said plurality of prefetch buffers, and wherein said control unit is configured to detect that predecode is complete for a first buffer of said plurality of prefetch buffers, and wherein said control unit is configured to select a second buffer of said plurality of prefetch buffers for predecoding to generate predecode data for storage in an instruction cache, the control unit selecting the second buffer responsive to said buffer pointer in said first buffer; and
    an input/output (I/O) device configured to communicate between said computer system and another computer system.

14. The computer system as recited in claim 13 wherein said plurality of instruction bytes in said second buffer are sequential to said plurality of instruction bytes in said first buffer.

15. The computer system as recited in claim 13 wherein said I/O device is a modem.

16. The computer system as recited in claim 13 further comprising an audio I/O device.

17. The computer system as recited in claim 16 wherein said audio I/O device comprises a sound card.

* * * * *